UNITED STATES PATENT OFFICE.

J. M. PATTERSON, OF WOODBURY, NEW JERSEY.

IMPROVED PROCESS OF UTILIZING THE TIN FROM TIN-PLATE CLIPPINGS, &c.

Specification forming part of Letters Patent No. 38,758, dated June 2, 1863.

*To all whom it may concern:*

Be it known that I, J. M. PATTERSON, of Woodbury, in the county of Gloucester and State of New Jersey, have discovered or invented a new and valuable mode of recovering or utilizing the tin on the waste clippings of tin-plates; and I do hereby declare that the following is a full and exact description of the same.

Immense quantities of pure tin are annually lost with the waste clippings from the plates which are worked up in manufacturing articles of tinware, gas-meters, &c., and any mode or process whereby the same or the greater portion of it may be easily and cheaply recovered from loss or rendered of value in the arts is of importance to the public; and to effect such recovery of the waste tin is the object of my said invention.

It consists in substituting, substantially as hereinafter described, an alloy of lead and tin for the pure tin on the waste clippings of tin-plates, and subsequently removing from the said clippings the greater portion of the adhering alloy by subjecting the said alloyed clippings to a draining process by heat, and finally uniting the whole of the melted metals together for use in the arts and manufactures.

To enable others skilled in the art to which my invention appertains to understand and use the same, I will proceed to describe it more minutely.

Having a quantity of the clippings at hand, I melt in a crucible or other suitable vessel, say, about twenty pounds of lead, and then add thereto as large a proportion of the clippings as the melted lead will cover conveniently, agitating and keeping up the melted condition of the lead until the tin on the clippings has become alloyed with the lead, which result takes place in a few minutes. I then withdraw the alloyed clippings and substitute others, and so continue until about fifty or fifty-five pounds of the clippings have been so passed through the melted metals in the vessel, or until the lead therein has about twenty-five per cent. of its weight of tin alloyed with it. In the meantime, or as I withdraw the alloyed clippings from the melting-vessel, I transfer them to any suitable charcoal-fire, supported by grating over an inclined plane or trough arranged in any suitable manner, so that the alloy which melts off from the clippings will fall into the trough and run out into the crucible or first melting-vessel, or into any other vessel from which it may be transferred to the said crucible. The crucible or first melting-vessel will then contain an alloy consisting of about twenty parts of lead and ten of pure tin, the latter metal having been wholly derived from the clippings during the process described. Now, as the best solder for tinware consists of about equal weights of lead and tin alloyed together, I add about ten parts of block-tin to the alloy in the melting-vessel described, incorporate them well together by stirring, and cast the whole into bars, thus producing bars of tin-solder of the best quality at a cost very considerably less than the same quality of the article can be produced in the usual way.

I do not intend to confine myself to the use of the apparatus described, nor to any particular arrangement of devices in alloying, melting, and draining the tin from the waste clippings, as it is obvious that the same may be varied or superseded without deviating from the mode herein described of recovering or utilizing the tin of the clippings from tin-plates by first alloying their tin with lead; but, Having fully described my invention and pointed out what I believe to be the best means of carrying it out in practice, what I claim as new therein, and desire to secure by Letters Patent, is—

Utilizing or recovering the tin of the waste clippings of tin-plates, substantially in the mode described.

J. M. PATTERSON.

Witnesses:
BENJ. MORISON,
JAMES P. DIX.